United States Patent

[11] 3,569,942

[72] Inventors Raymond B, Larsen;
Wallace B. Edwards, Riverton, Wyo.

[21] Appl. No. 751,884
[22] Filed Aug. 12, 1968
[45] Patented Mar. 9, 1971
[73] Assignee Datel Corporation
Falls, Va.

[54] METHOD AND APPARATUS FOR PROCESSING DATA
18 Claims, 3 Drawing Figs.

[52] U.S. Cl. .......... 340/172.5, 340/174.1
[51] Int. Cl. .......... G11b 5/00
[50] Field of Search .......... 340/172.5, 174.1; 235/157

[56] References Cited

UNITED STATES PATENTS

| | | | |
|---|---|---|---|
| 3,237,176 | 2/1966 | Jenkins .......... | 340/174.1 |
| 3,255,440 | 6/1966 | Woo .......... | 340/174.1 |
| 3,374,475 | 3/1968 | Gabor .......... | 340/174.1 |
| 3,133,274 | 5/1964 | Larkin .......... | 340/174.1 |
| 3,271,750 | 9/1966 | Padalino .......... | 340/174.1 |

*Primary Examiner*—Raulfe B. Zache
*Attorney*—John E. Reilly

ABSTRACT: Data in binary form can be stored on a magnetic recording surface in the form of positive and negative data pulses; and when retrieved, the leading and trailing edges of each pulse are differentiated into bipolar pulses which can be simultaneously error-checked and decoded to binary 1's or 0's represented by the data pulses recorded in each block of information recorded.

Patented March 9, 1971 3,569,942

2 Sheets-Sheet 1

INVENTOR.
RAYMOND B. LARSEN
WALLACE B. EDWARDS, JR.
BY John E. Reilly
ATTORNEY

INVENTOR.
RAYMOND B. LARSEN
WALLACE B. EDWARDS, JR.
BY John E. Reilly
ATTORNEY

METHOD AND APPARATUS FOR PROCESSING DATA

This invention relates to magnetic recording methods and systems, and more particularly relates to a novel and improved method and means for writing and reading back coded information utilizing a magnetic recording medium.

Numerous systems and recording techniques having been devised for storing coded information on magnetic tape. Generally, the information is stored in binary form at a predetermined tape speed and bit packing density so as to insure proper correlation between storage and later retrieval of the information. Of the conventional recording methods, the Nonreturn-To-Zero method is one commonly in use wherein a binary 0 and a binary 1 are represented by input data pulses or signals at different energy levels. If in the binary representation of a particular character two or more binary 0's or 1's occur in succession the tape magnetization will remain at the same level and will not vary from that level until there is a change in binary representation between a 1 and 0. Accordingly there is not always a clear distinction between the beginning and end of successive bits of information on the tape. For this reason some timing or synchronization is required to indicate the transition point between successive pulses, such as, by a timing track associated with the recording surface. Thus, the system requires exact correlation in tape speed for recording and subsequently retrieving the information, and also poses definite limitations on the bit packing density on the tape To overcome certain deficiencies in the NRZ method described, a double frequency or phase recording method has been employed in the past to more accurately distinguish between binary 1's and 0's but has definite limitations in the speed variations that can be tolerated in writing and reading each character block.

Accordingly it is an object and desirable feature of the present invention to provide for a new and useful method and means for magnetically recording and retrieving binary information which obviates external timing or synchronization between the writing and reading of information, greatly simplifies the circuitry required to store and retrieve the information, and further enables simultaneous error-checking and verification of the information without direct comparison with the actual data recorded.

It is another object of the present invention to provide a method and means for storage and retrieval of binary information on magnetic tape which is highly accurate, reliable and maintains a high degree of reproduction accuracy in magnetic recording systems.

It is a further object of the present invention to provide a system for recording and retrieval of binary information on magnetic tape which is readily comformable for use in recording different types of information at a high bit packing density, is largely independent of variations in speed in the storage and retrieval of the information, and greatly simplifies the circuitry required to retrieve and error-check the information.

In accordance with the present invention, preferably the binary bits in each character or unit of information are recorded as positive or negative square-wave pulses designating either a binary 1 or 0 according to the logic of the circuitry. When the information is played back, the leading and trailing ends of each bit can be differentiated into positive-to-negative, or negative-to-positive, alternating waves, or bipolar pulses, and each binary 1 or 0 is represented by two polarity changes or transitions going either from positive to negative, or vice versa. Accordingly there is no need for separate or external timing in retrieval of the information, this being accomplished in a unique way by sensing the sequence of arrival of each of the positive-negative or negative-positive pulses and setting or resetting a shift register in order to decode the information into a binary 1 or 0. Moreover, the information can be error-checked simply by counting the number of pulses in each block of information, being a multiple of two or the number of bits comprising each block, as the information is clocked into the shift register. A single shift register may be utilized both for transferring information to and from the tape as well as for error-checking the information simultaneously with its retrieval, thus greatly simplifying the circuitry required.

The above and other objects, advantages and features of the present invention will become more readily understood and appreciated from the following detailed description of a preferred form of the invention when taken together with the accompanying drawings, in which:

FIGS. 3A to 0 are wave forms of the preferred mode of storage and retrieval of binary information, in accordance with the present invention.

Figures 1, 2:
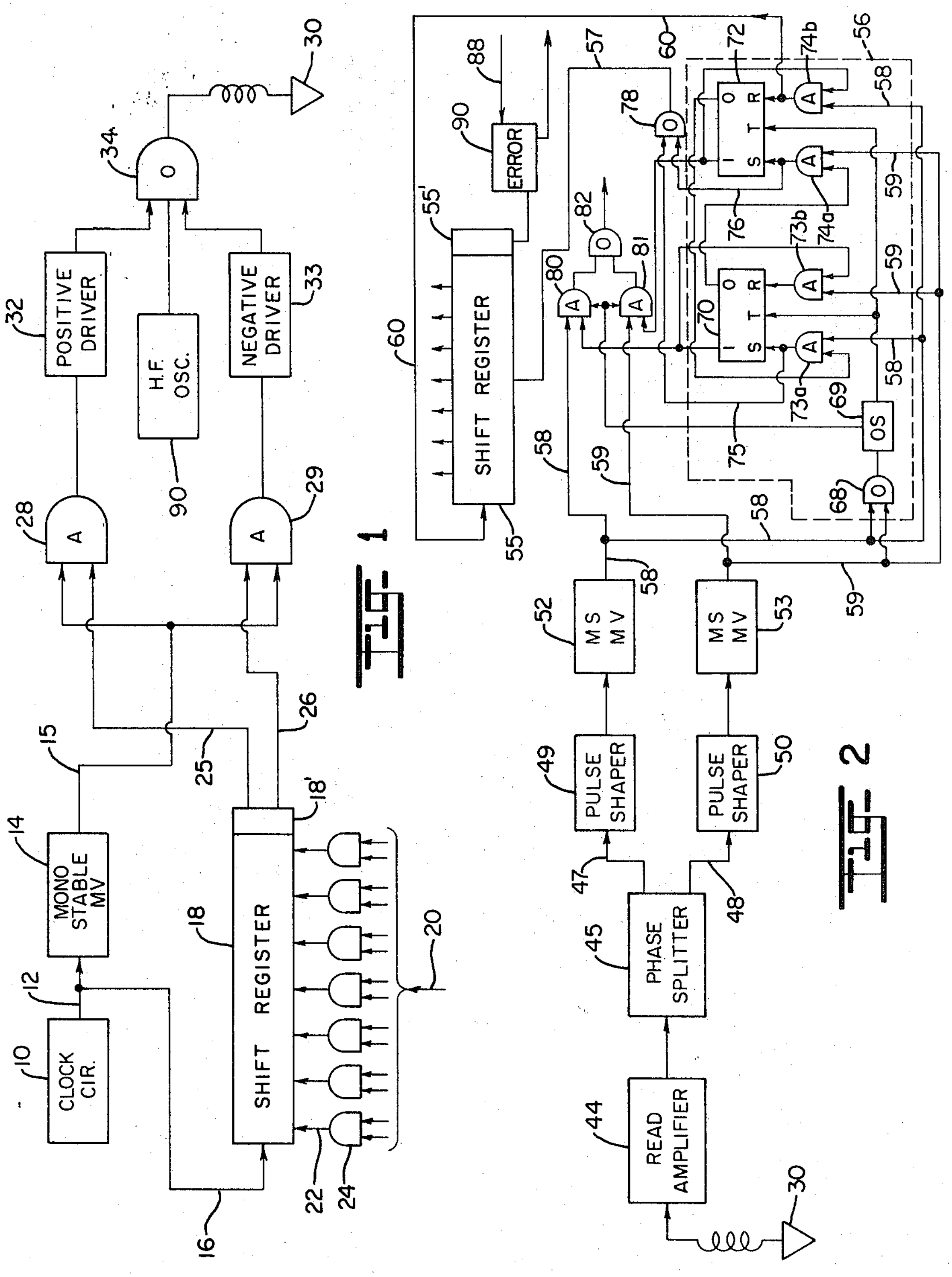
FIG. 1 is a schematic diagram of the circuitry employed for writing binary information on magnetic tape in accordance with the present invention.
FIG. 2 is a schematic diagram of the circuitry utilized for retrieving or reading back the information recorded on a magnetic tape in accordance with the present invention.

In FIG. 1 there is represented and schematically shown a circuit for digitally recording or writing information on magnetic tape. For the purpose of illustration, the information may be in the form of informational or functional characters supplied from an electrical input/output printer wherein the characters printed are transmitted to a magnetic tape or other remote station. This is customarily done through a series of electrical switches that are closed in in different combinations to produce binary bits representing each actual character printed.

In my copending application for patent for DIGITAL PULSE MOTOR CONTROL CIRCUIT, Ser. No. 680,086, filed Nov. 2, 1967, now U.S. Pat. No. 3,514,679 there is set forth a constant speed motor drive circuit specifically adapted for use in controlling the speed of advancement of a magnetic tape for writing character blocks thereon. The timing pulses which are generated in direct relation to actual motor speed are compared with the time constant of a monostable multivibrator and, through a control circuit, apply motor energizing pulses to accelerate the motor and hold it at a constant speed level for writing or reading characters back from the magnetic tape. Clock pulses are derived from the timing pulses, also, in order to time a counting circuit as well as to time the reading and writing of the character blocks represented by each combination of pulses transmitted from the printer or other external source of information.

In accordance with the present invention, and having specific reference to FIG. 1, a clock circuit, such as for instance, that described in my copending application, is designated at 10 to apply a succession of pulses over line 12 to a monostable multivibrator 14 and additionally to apply a succession of shift pulses over line 16 to a shift input terminal for shift register 18. In the circuitry shown, the shift register is a parallel-to-serial converter which receives the information bits representative of each character from an external source, designated input 20; and the external source may be typified by a keyboard printer wherein each character block consists of eight bits in combination including six information bits, a shift bit and a parity bit, each bit being being applied at one of two discretely identifiable signal levels each representing either a binary 1 or 0 in conventional fashion. It will be evident that the number of bits may vary according to the nature of the information and the combination of bits required to code the information.

The bits representing each character are simultaneously applied over data lines 22 from AND gates 24, the lines having connections to the separate stages of the shift register 18. Shift pulses delivered over line 16 are applied to the shift input terminal whereby to clock each of the binary bits in succession serially over output lines 25 and 26, a binary 0 output being applied over line 25 to AND gate 28 and a binary 1 output being applied over line 26 to AND gate 29. The shift register has an extra flip-flop stage 18' so that as the last bit is entered in parallel into the shift register, the stage 18' is reset to serially apply the bits loaded into the shift register over one of the output lines 25 and 26 to the AND gates 28 and 29. Each bit in succession is written by a magnetic recording and reproducing head 30 under the control of a positive driver 32 or a negative driver 33, the drivers being coupled to the outputs of the AND gates 28 and 29, respectively. As best seen from FIG. 3, the timing pulses applied over line 15 from the multivibrator circuit 14 will time the writing of each bit on tape so that AND gate 28 is enabled by the arrival of a timing disc pulse over line 15 and a data signal over output line 25. The positive driver is activated and is coupled through OR gate 34 to one end of the coil of the magnetic recording and reproducing head 30 to cause the head 30 to write the leading edge of a positive square wave pulse represented at 35 in FIG. 3. The pulse will remain at its maximum amplitude level until the multivibrator circuit 14 "times" out to interrupt the signal applied over line 15 to the AND gate thereby deactivating the positive driver and causing the write head to return to ground or zero and form the trailing edge of the square wave pulse 35. The write head will continue timing at the zero energy level until application of the next signal from the shift register. If a 1 bit signal is applied over line 26 the negative driver is activated to cause the write head to write a negative square wave pulse form 36, again the duration of the pulse being determined by the multivibrator 14. It is important to note at this juncture that each bit applied over one of the output lines 25 and 26 will be represented by the positive and negative wave form which is produced under the control of either the positive or negative driver in combination with the multivibrator 14 and will return to zero or ground before writing each next bit in succession. As a result, if two 1's or 0's are received in succession each will be represented by a separate wave form going either positive or negative and which in a manner to be hereinafter described eliminates the need for a separate or associate timing track for subsequent reading or decoding of the information from the tape. At the end of each character block an inter-record gap may be formed in the conventional manner, such as, in the manner described in my copending application, prior to writing each next character block in succession.

Figure 3:
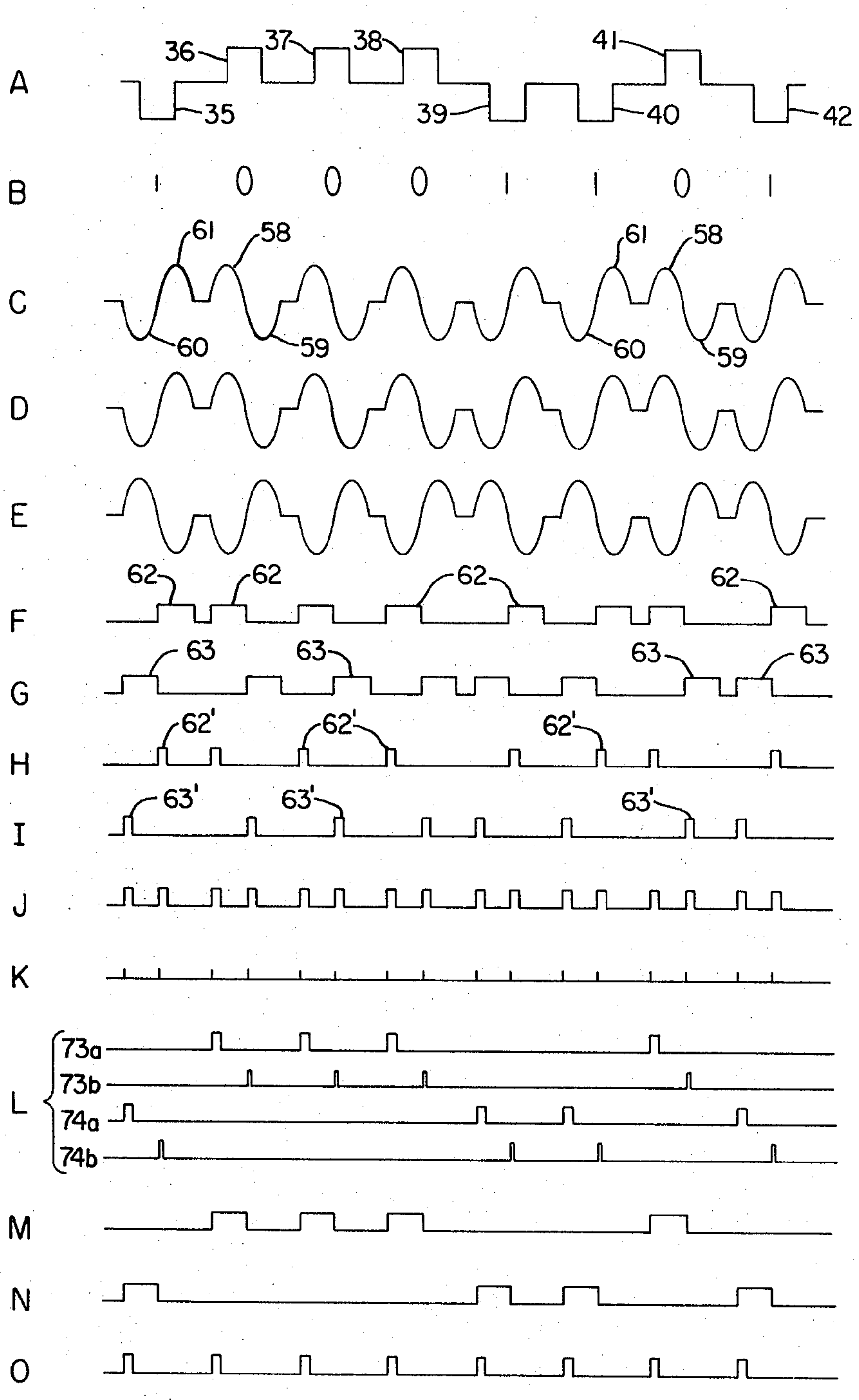

In the character block represented in FIG. 3, the binary digits 1000101 designated on line B will produce the digital pulses 35 42, the binary 0's being represented by the positive pulses 36, 37, 38 and 41 and binary 1's being represented by the negative pulses 35, 39, 40 and 42. In order to translate each digital pulse recorded into its corresponding binary number in an accurate, reliable manner without the need of a separate timing track, preferably the circuitry as schematically shown in FIG. 2 is utilized. Here, the write head 30 or another head senses the leading and trailing edge of each digital pulse recorded on the tape and induces through its coil a correspondingly positive-to-negative or negative-to-positive alternating voltage wave form which is applied through read amplifier 44 to a phase splitter 45. The phase splitter 45 may be of any conventional form and functions to produce bipolar outputs 180° out of phase which are applied over separate control lines 47 and 48 leading into pulse shaper circuits 49 and 50, respectively. Monostable multivibrators 52 and 53 operate to shorten the time duration of each of the pulses for application to a shift control circuit 56, the latter having a shift input control line 57 and an information line 60 leading to the shift register 55. The register 55 is an eight-bit serial-to-parallel shift register and, in a manner to be described, the shift circuit 56 is operative in response to the first of a succession of two pulses representing each binary bit from input lines 58 and 59 to deliver a shift pulse over line 57 to advance the shift register to each next stage in succession. The information line 60 selectively applies pulses to the shift register, each stage of the register being set or reset depending upon the presence or absence of a pulse from the information line 60 when the register is shifted to each stage.

Additionally, the shift register may be provided with an extra stage 55' to serve as a means of error-checking the information from each character block as it is entered into the register. For an eight-bit character block, eight counting pulses are required to order each block recorded into the shift register; and if the number of counts or pulses applied to the shift register is more or less than eight preceding the arrival of an "end of character" signal over line 88, the extra stage 55' is triggered to register an error in the error-checking circuit 90. The "end of character" signal may be produced in different ways, such as, for example, by comparing the pulses applied to the shift register with the number of pulses received from the timing disc for each character block.

Considering in more detail the wave forms generated in reading back the characters recorded on tape, the head 30 will sense the leading and trailing edge of each digital pulse as represented in FIG. 3A to produce a voltage wave form which is either positive or negative-going according to the polarity being sensed or detected. The amplified wave form is shown in FIG. 3C wherein it will be noted that the leading edge of the pulse 35 produces a negative-going wave form and the trailing edge produces a positive-going wave form; whereas the leading edge of the positive pulse 36 will produce a positive-going wave form and the negative-going transition of the trailing edge of the pulse 36 will result in a negative wave form. Accordingly, the positive or negative-going transition of each pulse recorded on tape will result in a positive or negative-going alternating wave form in the read function, and the complete bit is therefore represented by a combination of positive and negative-going wave forms or shapes.

Each voltage wave form is applied to the phase splitter 45 which is operative to produce a pair of bipolar outputs, 180° out of phase, as shown in FIGS. 3D and 3E. The positive phases of the bipolar output pulses applied over control line 47 are converted by the pulse shaper 49 to square wave pulses 62, as represented in FIG. 3F, and the output pulses applied over line 48 to the pulse shaper 50 to are converted to square wave pulses 63, as shown in FIG. 3G. For example, in reading the digital pulse 35 representative of a binary 1 it will be noted that the pulse 62 produced by the positive-going phase of the pulse applied over control line 47 is 180° out of phase to the positive pulse 63 produced by the positive-going phase of the pulse applied over control line 48. Conversely, the next bit in succession representing a binary 0 is differentiated into a square wave pulse 63 from pulse shaper 50 which is 180° out of phase to the pulse 62 produced by pulse shaper 49. The monostable multivibrators 52 and 53 shorten the time duration of the pulses produced by the pulse shapers 49 and 50 and, as represented in FIGS. 3H and 3I, will prevent overlapping of the pulses when applied in succession to the shift control circuit 56.

To order the information into the shift register, there is illustrated in FIG. 2 one suitable form of control circuit wherein an OR gate 68 is enabled by each of the pulses successively applied over control lines 58 and 59 from the pulse shapers 49 and 50 to trigger a one-shot 69 and apply timing pulses to the cross connected DC reset flip-flops 70 and 72. Here the triggering pulses from the OR gate 68 are represented in FIG. 3J and the timing pulses from the one-shot 69 are represented in FIG. 3K. The bipolar pulses are simultaneously delivered over lines 58 and 59 to pairs of AND gates 73*a* and *b* and 74*a* and *b* connected to the set and reset sides of each of the flip-flops 70 and 72. In addition the low level output of flip-flop 70 is connected to the AND gate 74*a* at the set side of the flip-flop 72 and the low level output of the flip-flop 72 is connected to AND gate 73*a* on the set side of flip-flop 70. Input lines 75 and 76 lead from the output of each of the respective gates 73*a* and 74*a* to enable OR gate 78 and apply a shift pulse to the shift register as illustrated in FIG. 30. When the first binary bit, as represented by a succession of two pulses 63' and 62' from the multivibrators 53 and 52, are applied over input lines 59 and 58 to the flip-flops, the first pulse 63' is applied over the gate input lines 59 to the reset side of the flip-flop 70 and the set side of the flip-flop 72 causing the gate 74*a* to be enabled and in turn to enable the OR gate 78 by transmission of a pulse over line 76. At the same time a signal is applied from the *i* or high level side of the flip-flop 72 to the input of the AND gate 74*b* over a predetermined duration as illustrated in FIG. 3N. Accordingly when the next successive pulse 62' is applied over lines 58 to the set side of the flip-flop 70 and reset side of the flip-flop 72 the gate 73 is not enabled by the pulse and the flip-flop remains in the reset condition so that a second pulse is not transmitted to the shift gate 78. However a gate **74*b* is enabled as shown in FIG. 3L to deliver a pulse over line 60** to the first stage of the register.

The next pair of pulses representing a binary 0 are applied in succession over lines 58 and 59 first to enable AND gate **73*a* then to enable the AND gate 73*b*; and again a single shift pulse is developed at OR gate 78 in response to the first pulse 62' applied to the AND gate 73*a*. Accordingly, the shift register is shifted only once for each successive pair of pulses representing a binary bit on the tape, since whichever flip-flop is set by the arrival of the first pulse will operate to reset the other flip-flop and lock it against transmission of a second pulse to the OR gate 78. When the register is shifted to each stage, it is toggled to a binary 1 by a pulse from the AND gate 74*b*, the latter being enabled by a pulse from input line 58 and the simultaneous presence of a signal from high level side of the flip-flop 72. It will be noted from FIG. 3L that this condition occurs only whenever successive pulses 63' and 62' are developed from each of the negative data pulses 35, 39, 40 and 42** on the tape.

The outputs from the high level sides of the flip-flops may also be utilized in cooperation with the bipolar pulses in input lines 58 and 59 and synchronized by the timing pulses from the one-shot 69 to detect the presence of synchronization errors in reproducing the information on tape. As illustrated in FIG. 2, the output signals from the flip-flops are applied to the inputs of AND gates 80 and 81 together with the bipolar pulses applied over lines 58 and 59, and these must be synchronized with the arrival of timing pulses from the one-shot in order to enable the OR gate 82 to indicate that the bipolar pulses for each bit have failed to arrive in the proper sequence. Specifically, the circuit will examine each successive pair of pulses representing a binary bit and provide an error indication if each pair in succession do not arrive over a different input line. For example, the binary 1 is represented by a succession of bipolar pulses applied over lines 59 and 58, respectively. If the pulses arrive in that order, the AND gate 81 will not be enabled since the output signal from the flip-flop 72 is not applied until after the timing pulse from the one-shot 69 has dropped off. The same would be true if the second pulse in succession arrives over input line 58; however if the second pulse in succession were to arrive over input line 59 the AND gate 81 would be enabled by the continued presence of the signal from the high level side of the flip-flop 72, and the OR gate 82 would be enabled to indicate the error.

The error checking circuit will distinguish between a succession of two pulses produced by each binary bit and between the last and first pulses of successive binary bits. For instance, the second pulse representing the binary 1 is applied over input line 58 and the first pulse representing the next binary 0 is also applied over the input line 58. However since the flip-flop 70 is not set by the second pulse an output signal is not applied from the high level side of the flip-flop to the AND gate 80 and therefore is not present at the input of the gate when the first pulse representing the binary 0 arrives.

In order to assure accurate read back of the information recorded on the tape, most desirably a high frequency bias signal is applied to the read head in order to erase or linearize tape magnetization as the wave forms are recorded and to alter individual characters within a previously recorded data stream. In recording, each positive or negative bit will tend to pulse the oxide film on the tape in one direction or the other, and the presence of the high frequency bias will cause a more direct return to zero without overlapping of the wave forms. This is preferably accomplished by a high frequency oscillator 90 having its output connected to the gate 34 leading to the coil of the head 30 so that when the gate is enabled the high frequency signal is applied to the head coil. In the event that it is not necessary to alter previously recorded characters the same may be accomplished by positioning a driver circuit between each monostable multivibrator 32, 33 and the OR gate 34 to apply a reversing pulse and accelerate the return to zero at the end of each pulse.

The circuitry is schematically shown and described for converting the information on tape and error-checking same and is given more for the purpose of illustrating the advantages in differentiating the leading and trailing edges of each binary bit into bipolar pulses. Logically, the bipolar pulses may be translated and error-checked utilizing circuitry other than the specific form illustrated and described herein. It will therefore be appreciated that the eight bits representing the binary information in each character block written on tape each produce a pair of bipolar pulses which without necessity of external timing means or of comparison with the original data which may be accurately verified. The information can be ordered into the shift register under the direct control of the bipolar pulses and can be instantaneously error-checked by counting the number of pulses received and detecting their sequence of arrival. A parity bit is not required in reproducing each character block and in fact the means of error detection employed is much more certain and reliable in checking serial data. It will further be evident that the method and means herein described may be employed in recording and reproducing other information which is represented by two discrete energy levels, such as, a binary 1 or 0, and avoids many of the problems associated with simultaneous recording of timing and information pulses on a recording medium as well as problems often resulting from speed variations of the recording medium in writing and reading back the recording signals. The system also permits a high degree of bit packing density on the recording medium for accurate and reliable recording of the information.

While there has been shown and described a preferred embodiment of the present invention, it will of course be understood that various modifications and alternative constructions may be made without departing from the spirit and scope of the invention, and the appended claims are intended to cover all such modifications and alternative constructions as fall within their true spirit and scope.

We claim:

1. In a data processing system utilizing a magnetic storage medium to store input data in the form of binary digit pulses comprising:

input means for recording the binary digit pulses on the medium in the form of data pulses at different discrete energy levels;

pulse sensing means for differentiating each different discrete energy level recorded into bipolar pulses in out-of-phase relation to one another; and means for decoding each of the bipolar pulses generated in succession into the binary digit pulse represented by the data pulse from which each of the bipolar pulses is derived.

2. In a data processing system according to claim 1 wherein said pulse sensing means is defined by a wave generating circuit characterized by differentiating one of the data pulses into a positive-to-negative alternating wave form and the other of said pulses into a negative-to-positive alternating wave form, and phase splitting means having first and second output control lines, said phase splitting means being operative in response to receiving each alternating wave form to produce a pair of bipolar pulses in out-of-phase relation to one another and to apply each of said bipolar pulses over a separate output control line, each bipolar pulse applied over each of the output control lines in response to one of said alternating wave forms being opposite in phase to each bipolar pulse applied over the respective output lines in response to the other of said alternating wave forms.

3. In a data processing system according to claim 2, each of said output control lines in said phase splitting means including a pulse shaper to convert the positive phase of each bipolar pulse from said phase splitting means into a control pulse, and a delay circuit to shorten the duration of each control pulse applied from said pulse shaper.

4. In a data processing system according to claim 1, further including error-checking means operatively associated with said decoding means to verify the sequence and number of bipolar pulses generated for each data pulse recorded on the storage medium.

5. A data processing system for processing character blocks of binary input data pulses represented by one of two discretely identifiable signal levels for recording on a magnetic storage medium comprising:

data pulse recording means for recording a positive pulse on the magnetic storage medium in response to a data input pulse at one of the discretely identifiable signal levels and for recording a negative pulse in response to a data input pulse at the other of the discretely identifiable signal levels;

a pulse sensing circuit including sensing means responsive to the leading and trailing edge of each pulse recorded on the magnetic storage medium to generate an alternating wave form with a positive or negative transition characteristic of each positive or negative pulse recorded;

means for sequentially applying control pulses over first and second control lines in which the sequence of control pulses applied over said control lines for one characteristic alternating wave form is opposite to the sequence of control pulses generated for the other characteristic wave form; and decoding means for each pulse recorded in a character block on the recording means having two stable positions and including control pulse sensing means operative to compare the sequential application of control pulses over said control lines to advance said decoding means to one or the other of two stable positions according to the sequence of application of control pulses over said control lines.

6. A data processing system according to claim 5, each of said first and second control lines including a delay circuit having a time constant shorter than the duration of the control pulses generated by said data pulse sensing means.

7. A data processing system according to claim 5, further including an error-checking circuit for counting the number of pulses applied over said control lines for each character block recorded on the magnetic storage medium.

8. A data processing system according to claim 6, further including means associated with said control pulse sensing means for sensing the arrival of each succession of control pulses representing a data pulse over said control lines and to produce an error signal when each of a succession of pulses is not applied over alternate control lines.

9. A data processing system according to claim 5, being further characterized in that said data pulse recording means includes means for accelerating the return to zero energy level of the trailing edge of each pulse recorded.

10. A data processing system according to claim 9, in which said accelerating means is defined by a high frequency oscillator.

11. In a system for decoding magnetically recorded character blocks of binary information in which each binary 1 and binary 0 is represented by a different discretely identifiable data pulse:

differentiating means including a pair of output control lines for translating each data pulse into a pair of control pulses in out-of-phase relation to one another and for sequentially applying each pulse of a pair over a separate control line, each pair of control pulses produced from a binary 1 data pulse being sequentially applied in applied in reverse order to the sequence of each pair of control pulses produced from a binary 0 data pulse; and a control pulse sensing circuit being operative to compare the sequence of arrival of each pair of control pulses from said control lines in order to identify the data pulse represented by each pair of control pulses.

12. In a system according to claim 11, further including a shift register having a series of stages each movable to one of two stable positions, an informational input line for selectively transmitting an information pulse to each register stage only in response to a predetermined sequence of control pulses, and said control pulse sensing circuit including a shift line operative in response to the one of each pair of control pulses received from said control lines to shift said register to each next stage in succession to sense the presence or absence of an information pulse from said informational input line; and error-checking means for sensing the sequential application of control pulses over said output line representing each data pulse in succession in order to verify the control pulses applied to said shift register without direct comparison with the data pulses recorded.

13. In a system according to claim 12, said control pulse sensing circuit including a shift control circuit comprising a pair of flip-flops interposed between said control lines and said shift line, said flip-flops each having two stable states and an AND gate at the inputs of each flip-flop, said flip-flops being interrelated to produce a single pulse for transmission by said shift line only in response to the first of a succession of two control pulses applied to the inputs of said flip-flops.

14. In a system according to claim 13, said error-checking means comprising an AND gate coupled to the output of each of said flip-flops in the shift control circuit with one of said control lines being connected to the input of each AND gate, and means for applying timing pulses to said AND gates synchronously with application of timing pulses to said flip-flops, the duration of output signals from said flip-flops being of a time duration to enable one of the AND gates only when successive pulses are applied over the same control line to said one of the AND gates.

15. In the method for processing data utilizing a magnetic storage medium in which input data is represented by two discretely identifiable levels, the steps comprising:

representing one identifiable level on the storage medium by a data pulse having a positive-going leading edge and negative-going trailing edge;

representing the other identifiable level on the storage medium by a data pulse having a negative-going leading edge and a positive-going trailing edge;

differentiating the respective data pulses into alternating wave forms in out-of-phase relation to one another; and followed by detecting the phase of each alternating wave form generated and decoding same into the one of the two discretely identifiable levels represented by the data pulse on the storage medium from which the alternating wave form was derived.

16. In the method according to claim 15, in which the step of detecting the phase of each wave form is characterized by generating bipolar pulses of opposite polarity and comparing the phase relationship between the bipolar pulses produced.

17. The method for processing data on a magnetic storage medium in which the input data is represented by two discrete identifiable levels, comprising the steps of:

recording one discrete level on the storage medium by a first square wave data pulse characterized by having a positive-going leading edge and negative-going trailing edge;

recording the other discrete level on the storage medium by a second square wave data pulse characterized by having a negative-going leading edge and a positive-going trailing edge;

differentiating the first and second data pulses into bipolar pulse pulses generated in which the bipolar pulses generated for each first data pulse are of opposite phase to the bipolar pulses generated for each second pulse; and followed by detecting the phase relation of each bipolar pulse and converting each bipolar pulse into the discrete level represented by the recorded pulses on the storage medium from which each wave form is derived.

18. The method according to claim 15, further including the step of accelerating the return to zero of the trailing edge of each data pulse recorded.

PO-1050
(5/69)

UNITED STATES PATENT OFFICE
CERTIFICATE OF CORRECTION

Patent No. 3,569,942 Dated 9 March 1971

Inventor(s) Larsen, Raymond B.

It is certified that error appears in the above-identified patent and that said Letters Patent are hereby corrected as shown below:

On the first page, the assignee's address is listed as "Falls, Va." and the correct address is "Falls Church, Va."

Claim 11, line 10, after "applied" (first occurrence) "in applied" should be deleted.

Claim 17, line 13, "pulse" should be deleted; same line, after "pulses" (first occurrence), "generated" should be deleted.

Signed and sealed this 7th day of September 1971.

(SEAL)
Attest:

EDWARD M.FLETCHER, JR.
Attesting Officer

ROBERT GOTTSCHALK
Acting Commissioner of P